Feb. 18, 1936.   F. A. PESCHL   2,031,125
SPHERICAL MACHINE
Filed Feb. 6, 1934   12 Sheets-Sheet 1

Fig. 1.

INVENTOR
FRANK A. PESCHL
BY *Richards & Geier*
ATTORNEYS

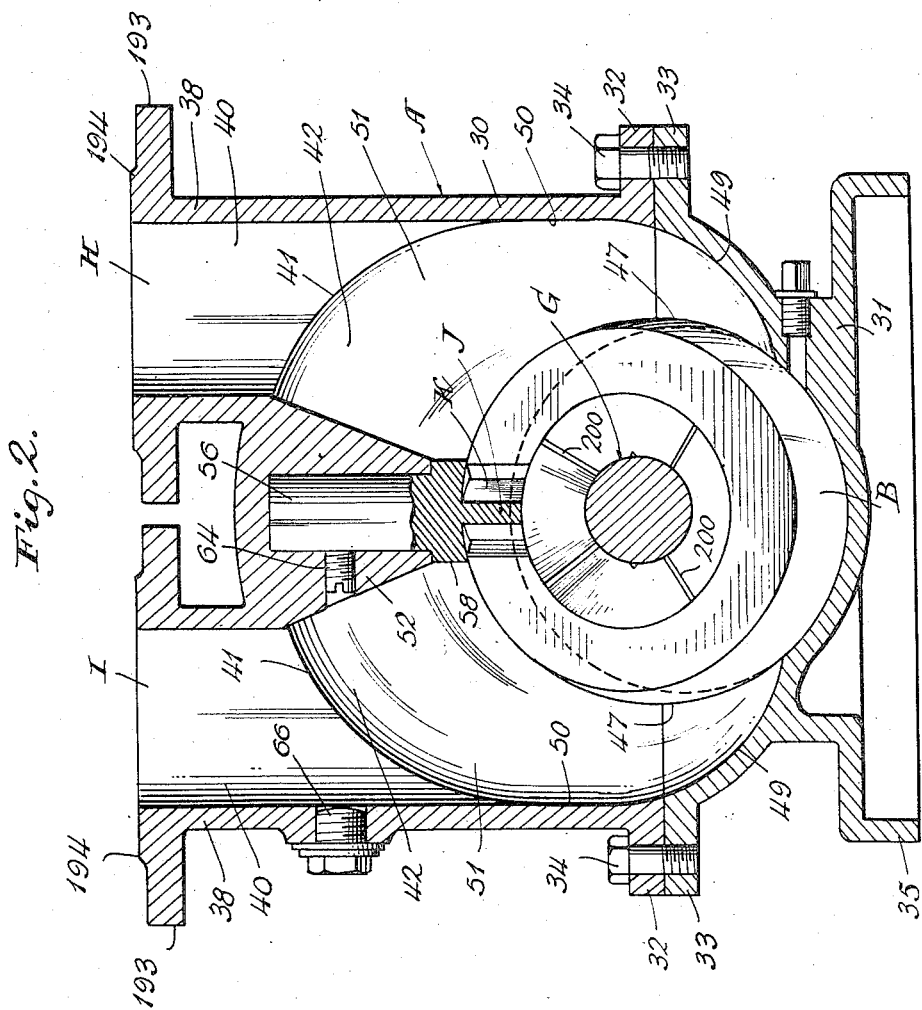

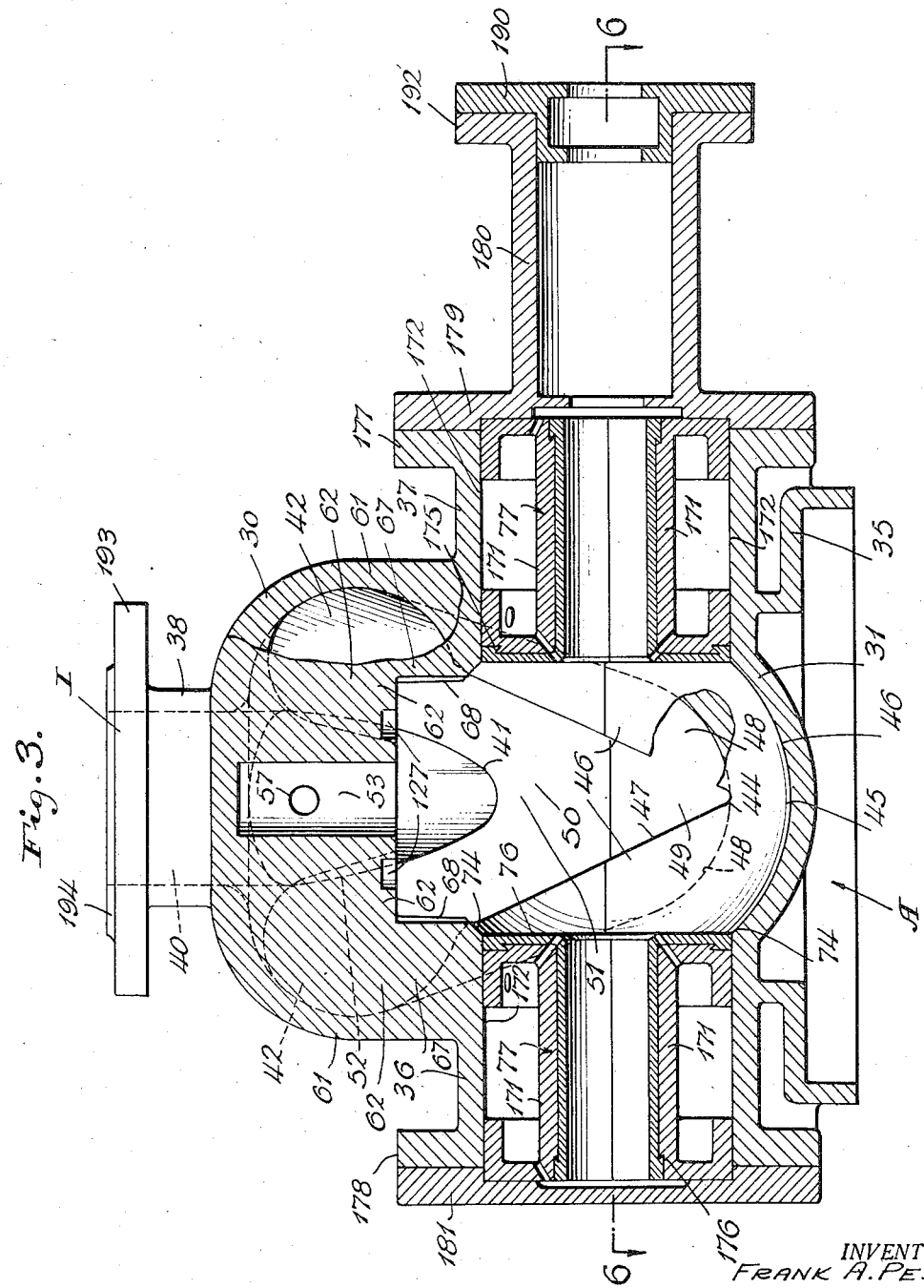

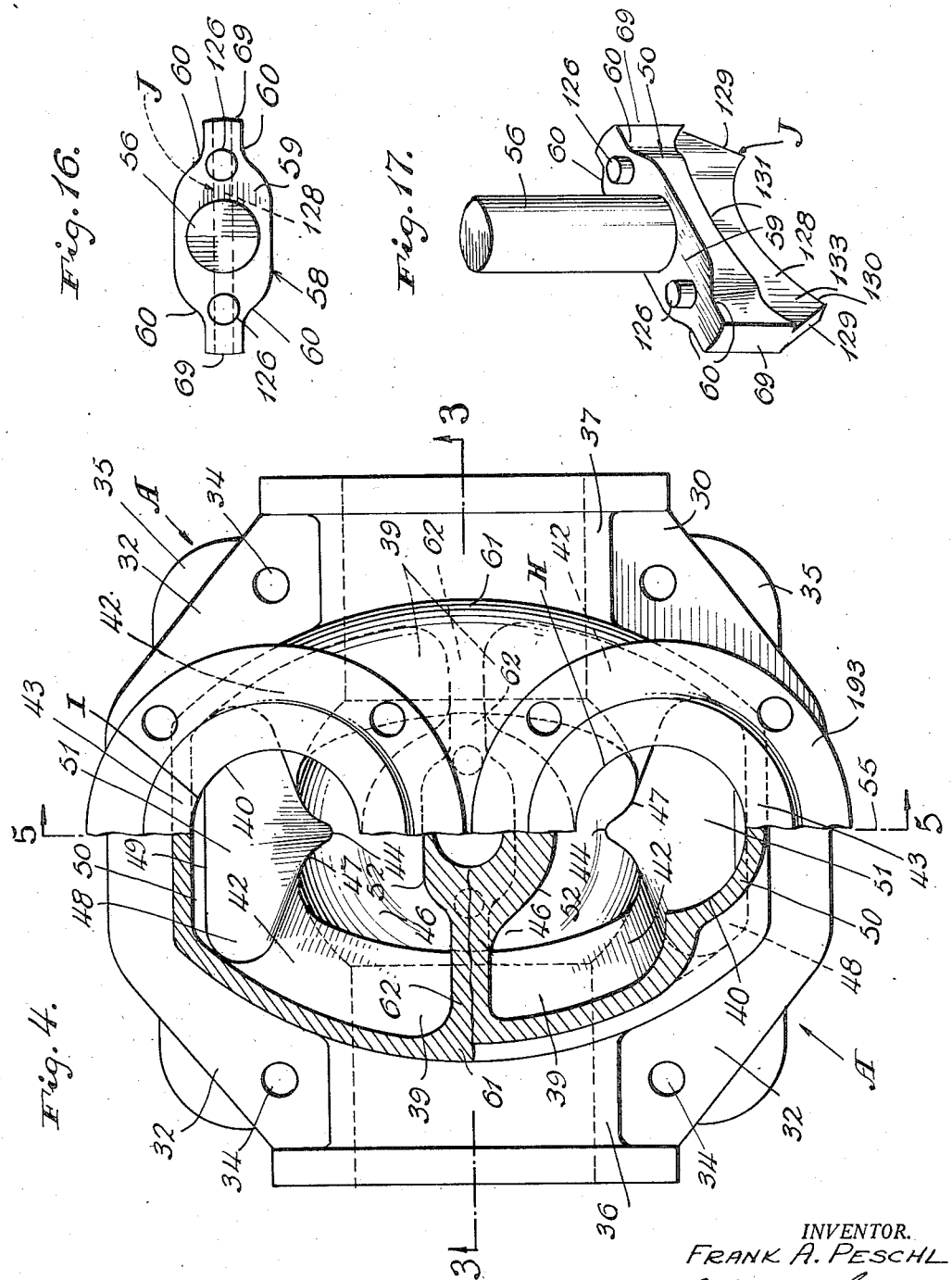

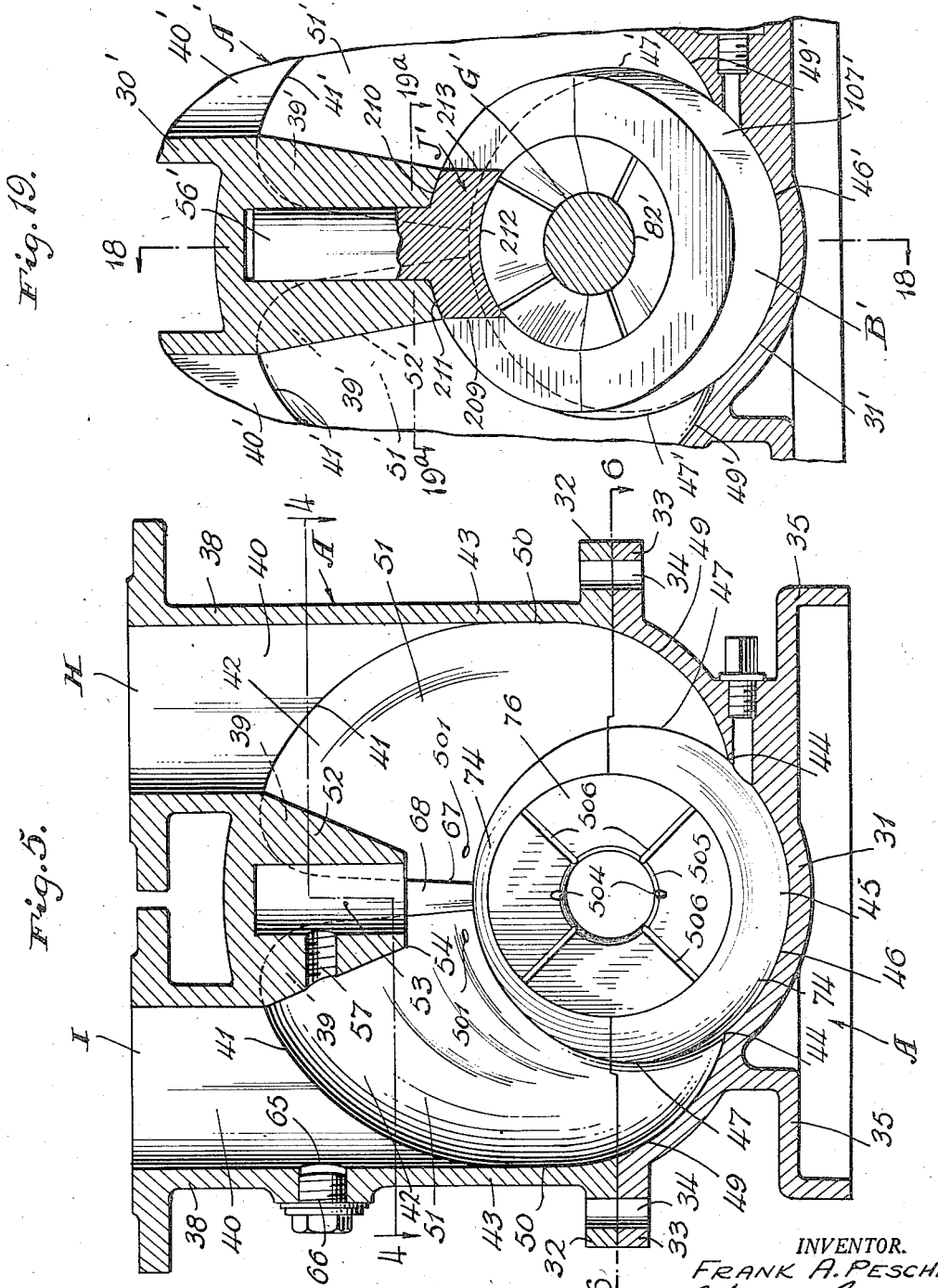

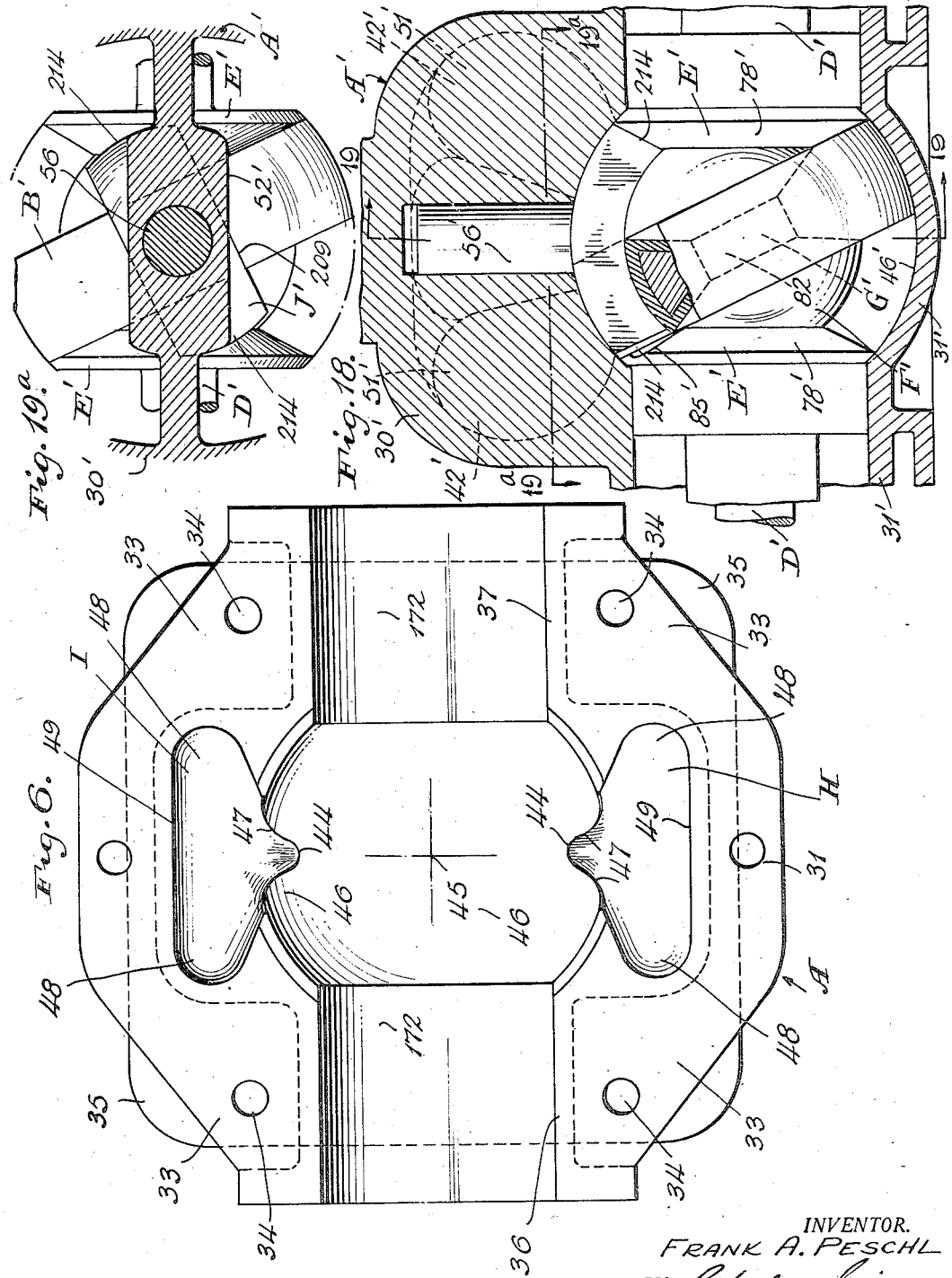

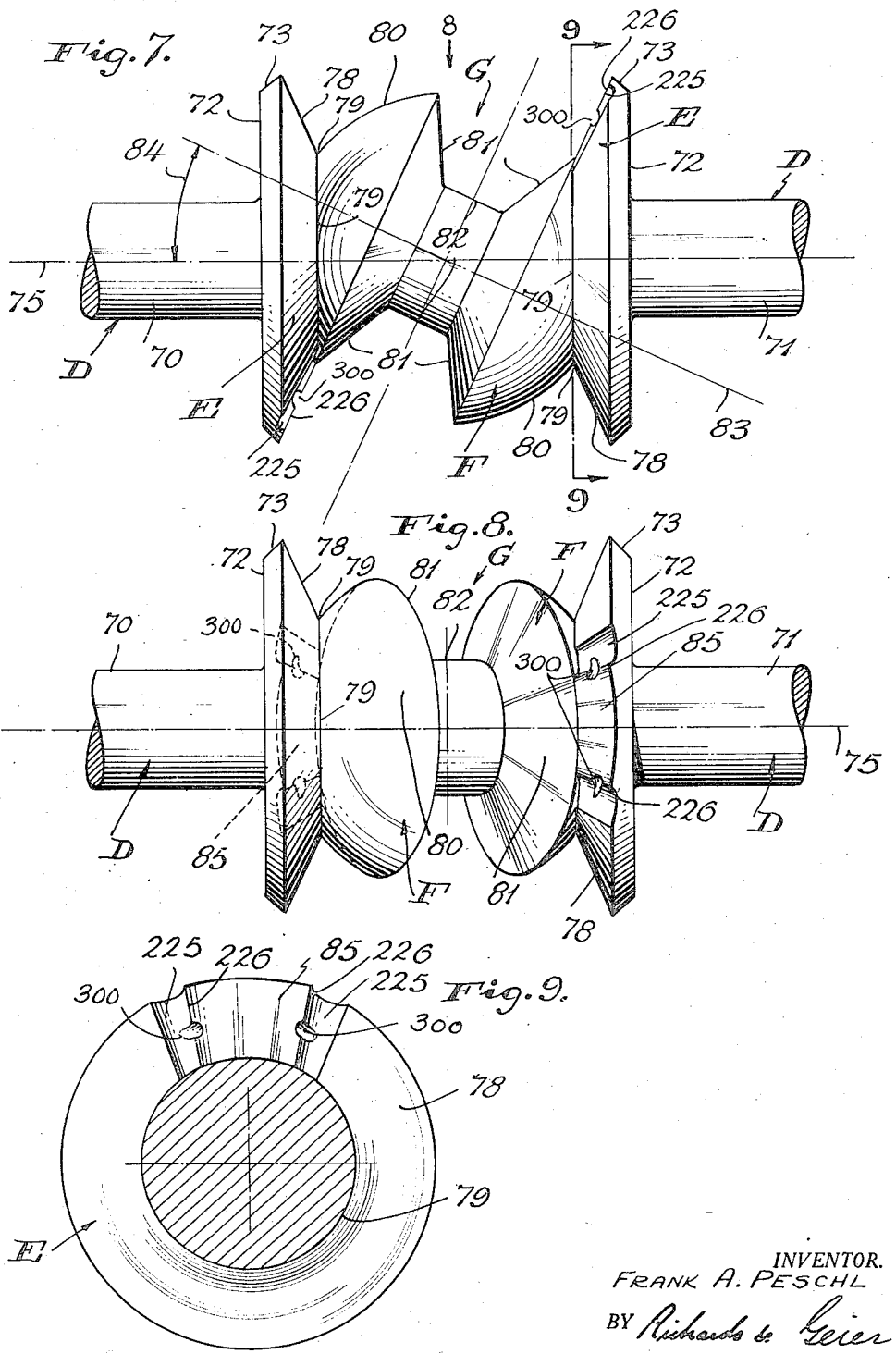

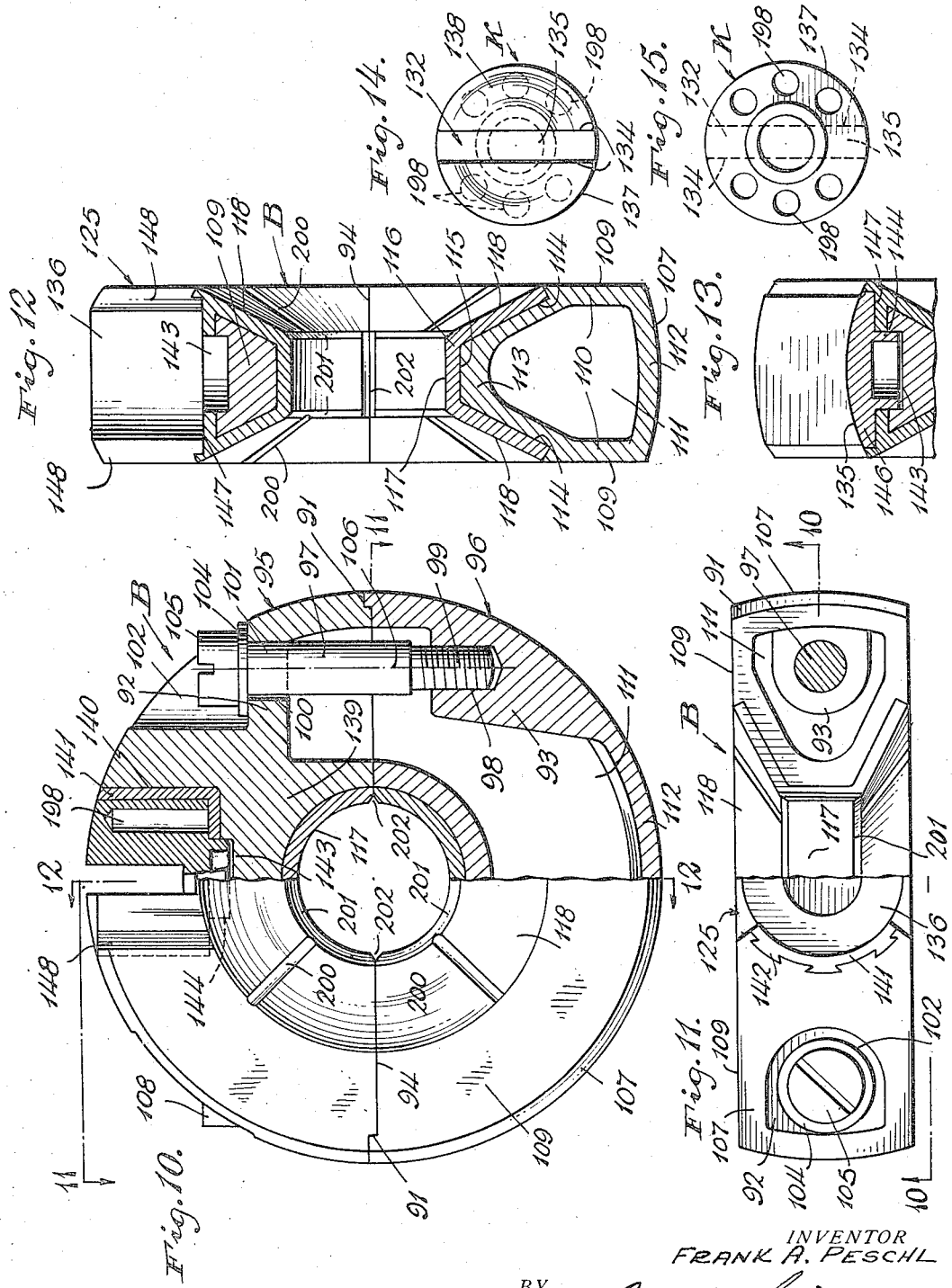

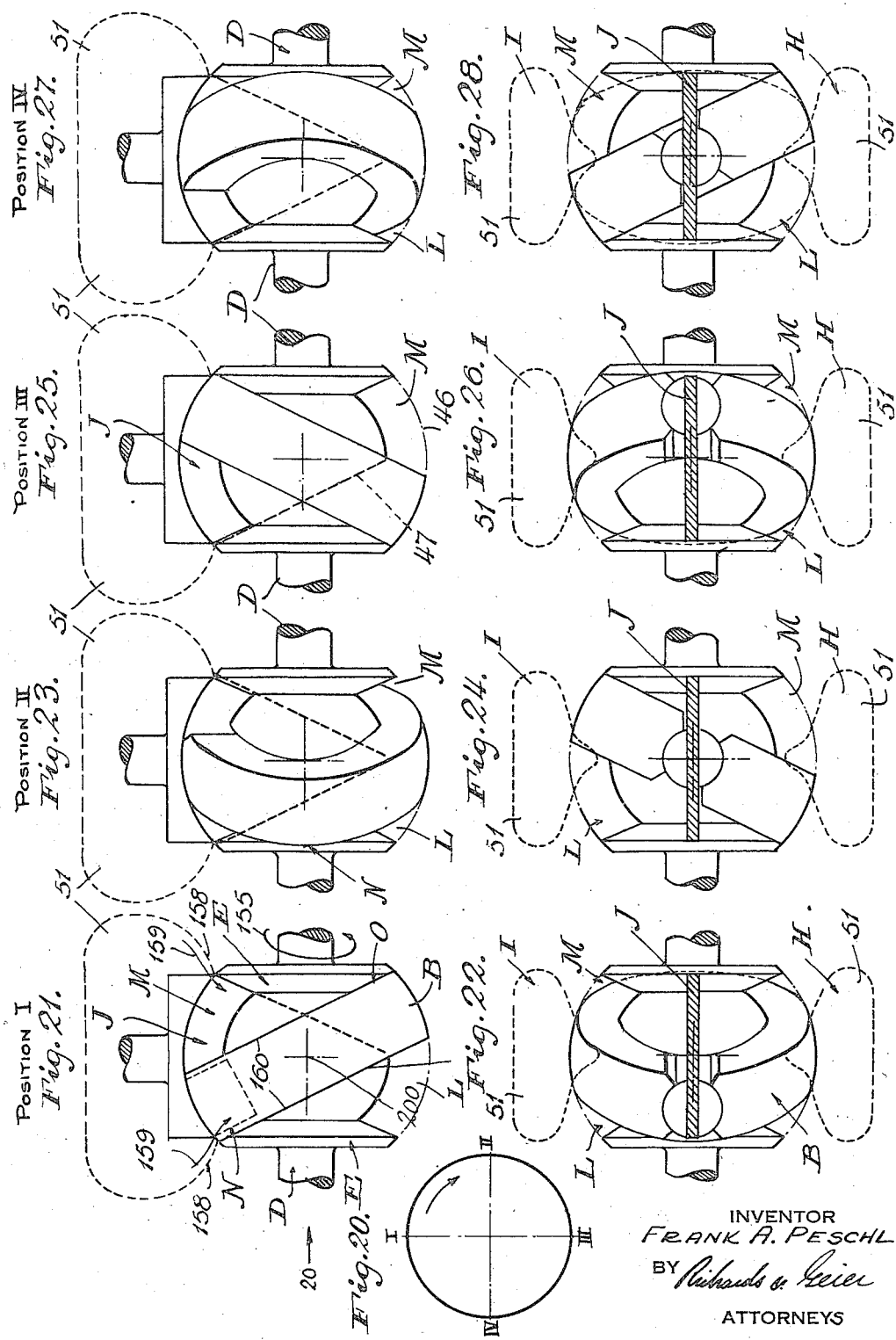

Feb. 18, 1936. F. A. PESCHL 2,031,125
SPHERICAL MACHINE
Filed Feb. 6, 1934 12 Sheets-Sheet 10
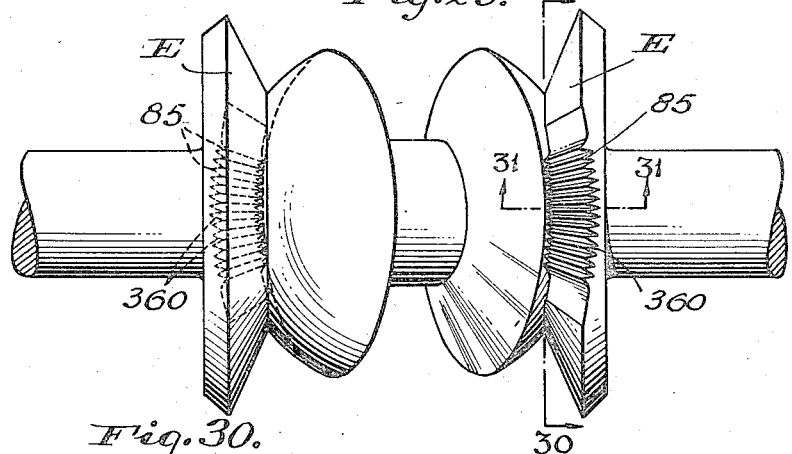
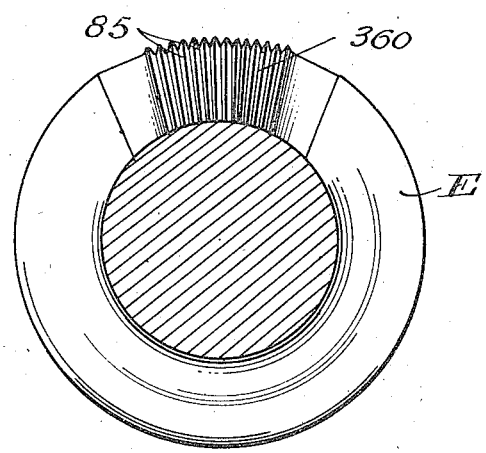
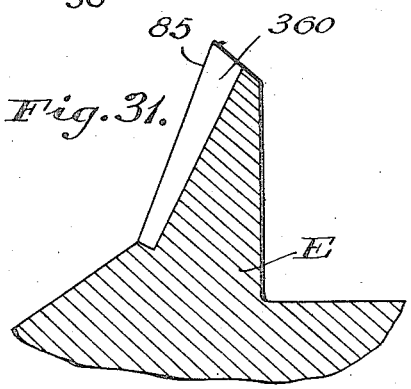
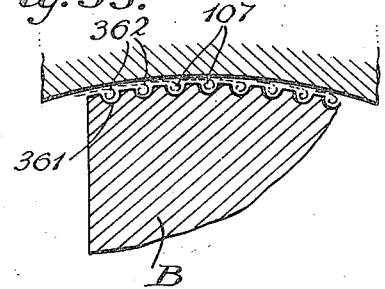
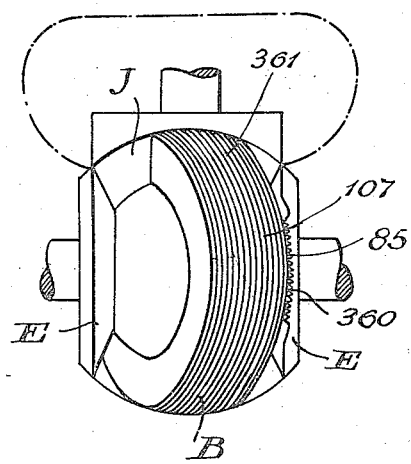
INVENTOR.
FRANK A. PESCHL
BY Richards & Geier
ATTORNEYS.

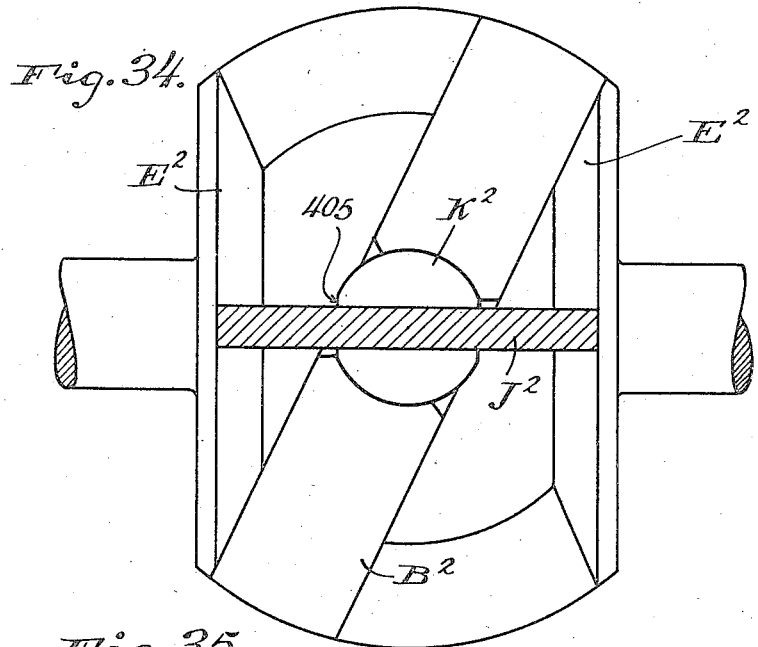
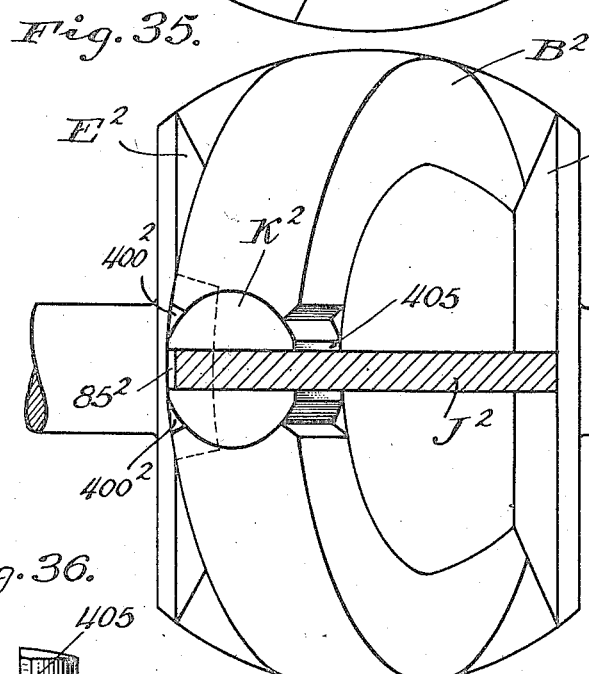
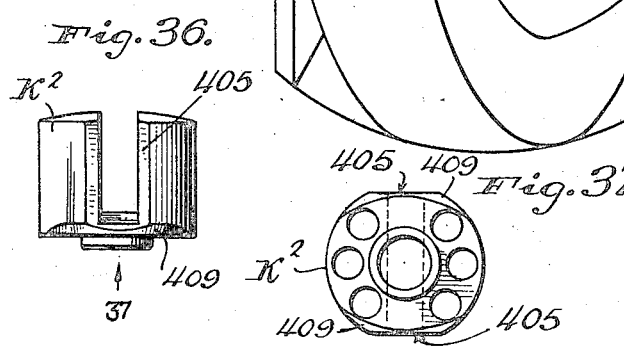
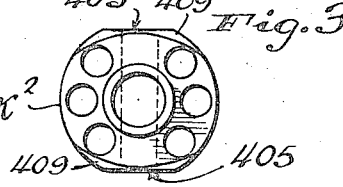

Feb. 18, 1936.　　　F. A. PESCHL　　　2,031,125
SPHERICAL MACHINE
Filed Feb. 6, 1934　　　12 Sheets-Sheet 12

INVENTOR.
FRANK A. PESCHL
BY Richards & Geier
ATTORNEYS.

Patented Feb. 18, 1936

2,031,125

UNITED STATES PATENT OFFICE 2,031,125

SPHERICAL MACHINE

Frank A. Peschl, Jackson Heights, N. Y., assignor to Erospha, Inc., New York, N. Y., a corporation of New York Application February 6, 1934, Serial No. 709,934

16 Claims. (Cl. 103—133)

The present invention relates to fluid actuators and particularly to spherical engines adapted for pumping liquids, creating a vacuum, compressing vapors and gases and so forth.

Although the present invention will be particularly described in its application to liquid pumps, it is to be understood that it may also be employed in connection with other spherical machines or apparatus, where a fluid or a liquid is passed into a casing to cause a shaft or a mechanism to be actuated, the flowing liquid or fluid being the source of energy.

The present invention, although not restricted thereto, is particularly concerned with a novel type of fluid actuator consisting of:

(1) A casing, the interior fluid receiving chamber of which may take the form of a spherical section or segment, provided with a spherical surface and with flat or more preferably conical side walls which may be fixed or more preferably rotatable in respect to said peripheral surface;

(2) An oscillating impeller or piston, the oscillating movement of which takes place laterally between said side walls and across said peripheral wall about a fixed center point;

(3) A driving member which has an oblique eccentric drive bearing for said impeller, positioning said impeller obliquely in said interior chamber so that it oppositely approaches and diverges from said side walls, undergoing a sinuous movement, said eccentric bearing causing the impeller to undergo said oscillating movement within the interior chamber whereby fluid is actuated or propelled from the inlet to the outlet;

(4) Inlet and outlet connections for the fluid which may enter through the side walls and/or through the peripheral walls, but preferably through the latter alone;

(5) A separating means or wall extending transversely across one side of said interior chamber between said inlet and outlet ports, which may be fixed in the casing or pivotally mounted in respect thereto;

(6) Guide means which may be located apart from the separating wall, but which is preferably combined with said separating wall permitting the impeller to partake of said relative pivotal and sliding oscillating movement without rotation with the eccentric bearing.

The annular impelling and/or propelling actuating or actuated side surfaces of the piston may be transverse to the axis of the eccentric bearing and parallel to each other in the preferred embodiment, or they may consist of frusto-conical surfaces, the axes of which may coincide with each other and with the axes of the oblique eccentric driving bearing, or be obliquely set to each other and to the axis of the oblique bearing.

The periphery of the impeller is spherical so as to conform to the periphery of the interior chamber and its oblique position within the interior chamber will cause said interior chamber to be divided into one or more annular wedge-shaped compartments which will be separated from each other by the impeller.

The oscillating movement of the impeller will continuously rotate these compartments within the interior chamber of the casing from the inlet to the outlet and cause them to pass through the separating means between the inlet and outlet ports. As these compartments pass through the separating member, they will be divided thereby and such divisions will successively decrease in volume in communication with the outlet port, compressing and/or discharging fluid therethrough, and at the same time they will increase in volume in communication with the inlet port receiving or drawing in fluid therethrough.

It is an object of the present invention to so coordinate the inlet and outlet port connections with the casing and with the inerior chamber of the casing that the flow of fluid into said chamber and out of said chamber will take place with minimum losses, without substantial obstruction to the flow of fluid at the inlet and outlet port connections, without the formation of vacuum spaces on the inlet side, without undesirable compression on the outlet side, and without the formation of an excessive amount of eddies or whirls therein, so that the compartments will be substantially immediately filled through the inlet and/or substantially immediately discharged through the outlet, as their subdivisions change in volume in passing through the separating member.

Another object is to so coordinate the impeller and interior chamber of the casing that a most efficient seal will be formed between the peripheral and side surfaces of the impeller and the corresponding conforming surfaces of the interior chamber of the casing, without utilizing critical dimensions and very close fits as would tend to cause jamming or cocking of the impeller with excessive friction and possible stoppage and injury to the apparatus during operation, particularly with liquid carrying suspended particles or solid particles of fibers which might lodge between the side surfaces of the impeller and the side walls of the interior chamber of the casing.

Another object is to provide an impeller construction which will assure substantially uniform non-pulsating reception of fluid through the inlet port connection and substantially uniform non-pulsating discharge of fluid through the outlet port connection.

In accomplishing these objects it has been found most satisfactory to design the inlet port connections so that they will extend substantially along and be controlled by a considerable length of the periphery of the impeller, the preferred port constructions having a maximum width closely adjacent to the separating wall and being gradually tapered from such portion of maximum width along the periphery of the impeller and along the periphery of the continuous spherical surface of the interior chamber to extend a distance of somewhat less than 180° along said periphery.

The inlet and outlet ports are preferably contoured as spherical cores or isosceles triangles, which extend from adjacent the separating means or walls, where they have their maximum width, to terminate somewhat short of a point diametrically opposite said separating means in the peripheral spherical wall of the interior chamber. The shape and character of the ports should be so controlled by the oscillation of the impeller, that the side edges of the impeller, or piston will coincide with and/or slightly over or underlap the terminal edges of said ports at the extreme oblique position of its oscillating movements.

In the preferred form of the invention to provide a most satisfactory sealing or packing between the side and peripheral surfaces of the impeller and the corresponding surfaces of the internal chamber, it has been found most desirable to prevent contact between said corresponding surfaces of the impeller and the interior chamber, and to position the impeller obliquely within the chamber in such manner by its oblique eccentric bearing, that a spacing of several thousandths of an inch will always be provided between such surfaces.

In conjunction with this space or surface packing or sealing effect, it has been found particularly desirable in certain constructions to provide a series of grooves or ridges transverse to the direction of the leakage, which grooves or ridges will tend to set up a substantially high resistance to the leakage flow across the side propelling or peripheral surfaces of the impeller and the correspondingly closely positioned conforming internal surfaces of the spherical casing of the pump.

This surface or space packing or sealing is most satisfactorily accomplished by having the propelling or impelling surface of the piston and the side wall of the interior chamber conform to each other over a substantial area, with the side wall of the interior chamber in the preferred form being provided with a recess which receives and has the same contour as a portion of the side of the impeller without contacting therewith. In this preferred form of surface or space packing between the impeller and interior chamber, the side walls of the interior chamber are preferably caused to rotate with the central oblique eccentric bearing so that the side surfaces of the impeller will always obliquely approach and depart from the same portion of the side wall.

In assuring a non-pulsating inflow and egress of fluid, it has been found most satisfactory to provide a piston, the side impelling surfaces of which are transverse to the axis of the eccentric bearing and are parallel to each other.

When the side impelling surfaces are substantially spaced from each other, it is desirable to leave large spaces within the body and to provide a substantially hollow construction to enable ready control of the center of gravity and inertia forces of the piston.

With such construction, it is desirable to cover the space or interstices between these side walls by a peripheral wall closely conforming to the peripheral surface of the chamber and also by a central annular member cooperating with the central oblique eccentric bearing at the inside of the piston or impeller.

This piston or impeller is preferably provided with a transverse slot to receive the separating wall or member and this slot is most desirably provided with a socket to receive a slotted guide, the slot of which receives said separating wall and which is designed to reciprocate backwardly and forwardly along said separating wall with the oscillating movement of the piston or impeller.

With an impeller of the type just described to prevent undue stress against the peripheral wall of the casing with which the guide contacts and/or against the impeller with which the guide also contacts, and also to lessen the unbalanced stresses upon such guide, it has been found most desirable to form said guide of cylindrical shape and form the socket in the transverse slot in the impeller of similar shape to receive said guide.

With such cylindrical slotted guides, it has been found desirable to position the center of gravity closed to the peripheral surface of the chamber of the casing and of the impeller and this is preferably accomplished by lessening the weight of the guide interiorly and proportioning the residual mass so that its greatest weight will be concentrated away from the common center point.

To permit the impeller or piston to oscillate in respect to the wall about said cylindrical guide, the transverse slot should desirably diverge outwardly on each side of said cylindrical socket or guide member, forming a space in which the liquid or fluid may be compressed and/or in which a vacuum may be formed. To overcome this the preferred form of the invention may also include suitable recesses or grooves in the side wall of the interior chamber or in the piston to assure that such compression and/or vacuum will be immediately relieved to assure better operation of the pump.

It has been found desirable to reduce the volume, within which such compression or vacuum action may take place, and to accomplish this it has been found satisfactory in one embodiment to increase the diameter and size of the cylindrical guide so that its diameter will be substantially greater than the width of the impeller or piston, with the result that it is necessary to flatten the opposite side walls thereof to the width of the impeller so that it will not project beyond the sides of the impeller upon the close adjuxtaposition of the conforming side surfaces of the impeller and of the internal side walls.

Due to the conformation of the side walls of the interior chamber with the side surfaces of the impeller there is a possibility that dirt or solid particles carried in the fluid or liquid being actuated may tend to wedge within said conforming surfaces and to overcome this, wiper grooves are provided with sharp edges along the edge of said conforming surface, preferably on the side walls to prevent such solid particles or fibers from entering into said conforming areas and/or spaces.

During operation the axis of the impeller, the axis of the shaft and the central axis of the casing should all intersect at a common center point. With the rotating side walls however in the preferred embodiment wear takes place between said side walls and adjacent bearing surfaces of the casing which might tend to prevent said axes intersecting at a common point.

To assure such coincidence even though wear takes place it has been found satisfactory to provide adjustable thrust bearings for said side walls, which may be readily adjusted from the sides of the casing through the bearings of the main driving shaft.

The center oblique eccentric bearing preferably consists of a central cylindrical member and side face members, which may inwardly converge or approach or be transverse to the eccentric or to the axis of said cylindrical portion.

It has been found desirable in design of the pump to form said center cylindrical surface with such diameter in regard to the said side surfaces that the central cylindrical surface will serve to correctly radially position the impeller to assure avoidance of contact between the periphery of the impeller and the periphery of the chamber and prevent wedging of said impeller between the side surfaces of the central eccentric bearing, while said side surfaces will take care of the oscillating movement and assure avoidance of contact between the sides of the impeller and the conforming recesses of the side walls of the interior chamber.

The above and other objects will appear more clearly from the following detailed description, when taken in connection with the accompanying drawings which illustrate a preferred embodiment of the inventive idea.

In the drawings:

Figure 1 is a longitudinal sectional view of the assembled spherical machine, taken upon the line 1—1 of Fig. 2.

Figure 2 is a transverse sectional view of the assembly taken upon the line 2—2 of Fig. 1.

Figure 3 is a longitudinal sectional view similar to Fig. 1, but with the impeller, separating wall, guide and shaft removed from the casing.

Figure 4 is a top view of the casing of Fig. 3 in fragmentary section, as indicated by the line 4—4 in Fig. 5.

Figure 5 is a side sectional view upon the line 5—5 of Fig. 4.

Figure 6 is a top view of the lower section of the casing taken upon the line 6—6 of Fig. 5.

Figures 7, 8 and 9 are fragmentary views upon an enlarged scale of the combined shaft and side wall and central oblique eccentric bearing removed from the assembly, Fig. 7 being a side view, Fig. 8 being a top view in the direction indicated by the arrow 8 in Fig. 7, and Fig. 9 being a side sectional view along the line 9—9 of Fig. 7.

Figures 10, 11 and 12 are views of the impeller or piston removed from the assembly upon an enlarged scale, Fig. 10 being a side view in half section with the guide shown in position, Fig. 11 being a top view in fragmentary half section upon the line 11—11 of Fig. 10, and Fig. 12 being a side sectional view taken upon the line 12—12 of Fig. 10.

Figures 13, 14 and 15 show the slotted cylindrical nut or guide, Fig. 13 being a side sectional view of the guide in position in the impeller, Fig. 14 being a top view of the guide member, and Fig. 15 being a bottom view.

Figures 16 and 17 are views of the separating wall removed from the assembly, Fig. 16 being a top view and Fig. 17 being a top perspective view upon an enlarged scale.

Figures 18 and 19, and 19a show an alternative construction with an oscillating or rotatable separating wall, Fig. 18 being a longitudinal sectional view similar to Fig. 1; Fig. 19 being a side sectional view taken upon the line 19—19 of Fig. 18, and Fig. 19a being a top sectional view upon a smaller scale taken upon the line 19a—19a of Fig. 19.

Figures 20 to 28 are diagrammatic views illustrating the various positions of the impeller during the cycle of oscillating movement in transferring fluid from the inlet to the outlet port and in controlling inlet and outlet connections.

Figures 29 to 33 show the application of a system of packing grooves or ridges to the spherical device, Fig. 29 being a top view; Fig. 30 being a side view upon the line 30—30 of Fig. 29; Fig. 31 being a fragmentary sectional view upon the line 31—31 of Fig. 29 upon an enlarged scale; Fig. 32 being a diagrammatic side assembly view upon a relatively small scale and Fig. 33 being a fragmentary sectional view illustrating the application of the sealing grooves to the impeller structure.

Figures 34 to 37 show a modified form of a cylindrical abutment or sliding guide member, Figs. 34 and 35 being top views of the assembly similar to Figs. 22 and 24 but upon an enlarged scale with the piston or impeller in different positions, and Figs. 36 and 37 are respectively side and bottom views of the guide or nut removed from the assembly of Figs. 34 and 35.

Figure 38:
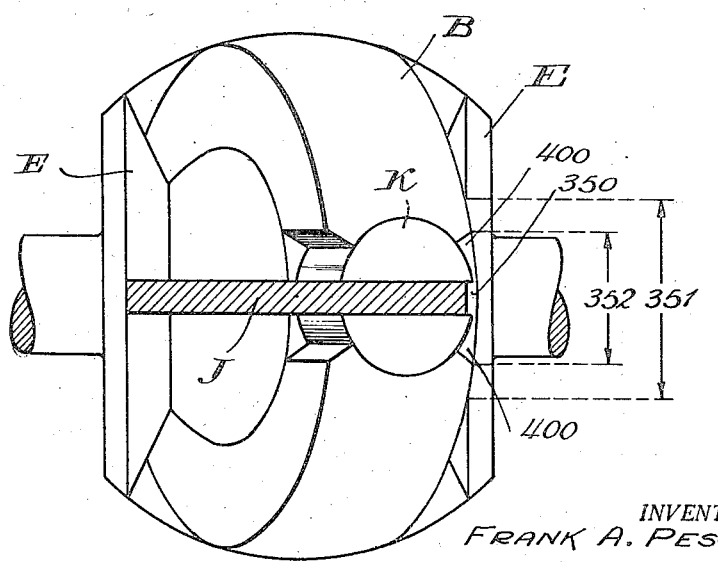

Figure 38 is an assembly view of the embodiment of Figs. 1 to 17 similar to Fig. 26 but upon an enlarged scale showing the seal formed by the surface packing between the side of the impeller and the conformation of the side wall, which prevents leakage across the end of the separating wall.

Figure 39:
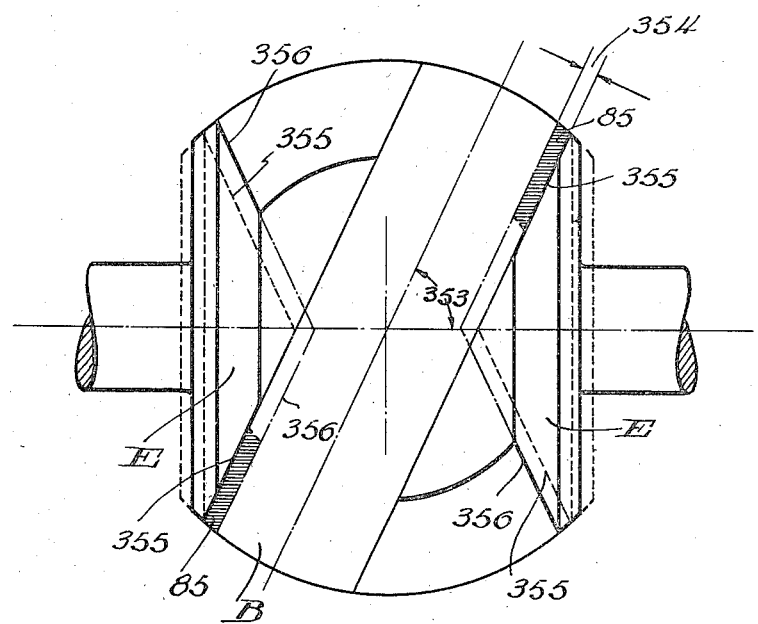

Figure 39 is a schematic view similar to Figs. 1 and 25 illustrating the relationship between the surface seal between the side walls and the impeller and its relationship with respect to the angle of the side walls and the angle of oscillation of the impeller.

The spherical machine, or fluid actuating device as shown in Figs. 1 and 2, is provided with a casing A, a laterally oscillating impeller B and a main drive shaft D. With the drive shaft rotates the side walls E, and the central ball element F provided with the oblique slot G. Fluid is fed into and removed from the interior chamber of the casing A by the ports H and I. The impeller B is transversely slotted to receive the separating wall J, which separating wall J also receives and guides the cylindrical slotted guide K.

The case A as shown in Figs. 3 to 6, may be formed of two sections 30 and 31, which are provided with the flanges 32 and 33, and the bolt connections 34. The lower casing section 31 is provided with the feet 35 to enable its support and attachment to a suitable supporting structure. The sides of the casing are provided with the tubular projections 36 and 37 to receive the shaft D.

The upper portions of the inlet and outlet connections H and I pass through the tubular members 38 in the form of cylindrical bores 40. The members 38 extend upwardly from the upper section 30 of the casing A.

When these bores 40 enter the interior of the casing A at the lines 41 (see particularly Figs. 2 and 5) they widen laterally as indicated at 42 (see Figs. 3, 4 and 5) and also extend inwardly in the form of two arms toward the position of the wall J, forming the antechambers 51 (see Figs. 2, 3, 4 and 5).

These antechambers 51 extend downwardly along the sides 43 of the casing outside of the normal position of the peripheral spherical surface 46 if continued (see Fig. 5) until they terminate at the point 44 somewhat short of the bottom point 45 of the interior chamber. This bottom point 45 is positioned diametrically opposite to the separating wall J (see Fig. 5). These antechambers 51 intersect the spherical surface 46 as triangularly shaped openings 47, the points of which depend downwardly along the continuous peripheral spherical wall 46 of the interior chamber of the casing A.

It will be noted that the lateral widening of the antechamber 51 indicated at 42 in the upper section 30 of the casing A continues into the lower section, as indicated at 48, in the lower section 31 of the casing A (see Figs. 3 and 6). The bottoms 49 of the antechamber 51 in the lower section 31 and 50 in the upper section 30 (see Figs. 3, 5 and 6) are positioned deeply within the sides 43 of the casing so as to provide a large outlet and inlet flow area over a large portion of the periphery of the impeller B, as indicated in Figs. 1 and 2.

The extensions or arms 39 at the upper part of the antechamber 51, are separated by the downward conical projection 52 which is connected to the side walls 61 by the wall portions 62 of the casing A. The projection 52 is provided with a central bore 53 forming a mount for the structural element carrying the separating wall J. It will be noted in Fig. 5 as the conical mount 52 depends it flattens until it reaches its bottom portion 54 (see Fig. 4) permitting the antechambers 51 to increase in width along the axis 55 (see Fig. 4).

This enlargement of the area of the antechambers 51 along the axes 55 is continued along the mount for the separating wall J which is shown in assembled form in Figs. 1 and 2, and removed from the casing in Figs. 16 and 17.

The mount for the separating wall J is provided with a central bolt mount 56 which fits into the bore 53 of the depending converging member 52 of the casing A in which it is rigidly held by means of a setscrew 64 inserted through the opening 57. This set-screw 64 may be tightened by a tool inserted through the opening 65 in the wall 43, which opening is closed by the threaded member 66 (see Figs. 2 and 5).

The separating wall member J is provided with a body element 58, the upper surface 59 of which abuts the lower surface 54 of the downward projection 52 and the edge portions thereof as indicated at 60 are curved to conform to the convergence of the projection 52 and to conform to the walls 62.

It will be noted that the transverse walls 62 are provided with the end extensions 67, the inner edge 68 of which are conformed to fit the outer vertical edge 69 of the body member 58 (see Figs. 3, 5, 16 and 17).

The arrangement of the antechambers 51 is such that the impeller B during its oscillating movement laterally across the interior chamber of the casing A will receive fluid or liquid and will discharge the same with a minimum of disturbance of the flow of the liquid and without hydraulic shading by the edges of the impeller B so that the spaces open within the casing A by the lateral oscillation of the impeller or piston will be substantially immediately filled with liquid or fluid without wire-drawing or restriction, and in a streamline fashion along the side of the impeller.

The impeller or piston B is actuated by the rotation of the shaft B to oscillate between the side walls by the oblique groove G formed in the ball F.

The side walls E and oblique driving slot G may be formed in separate units adjustably joined together and to the sections 70 and 71 of the main shaft D (as shown in Figs. 7 and 8) and they may be made in one piece, as shown.

Referring to Figs. 7 and 8 the side wall members are formed with an external flat bearing surface 72 and with a peripheral spherical surface 73.

Referring to Figs. 3, 5, 7 and 8, the surfaces 73 of the side walls E conform to, are in close adjuxtaposition in respect to, and slightly spaced from the periphery 74 of the spherical peripheral surface 46, while the flat surfaces 72 transverse to the axis 75 bear upon the faces 76 of the thrust bearing structures 77. The conical surfaces 78 of the side walls E form the lateral limits or side surfaces of the interior pumping chamber and interior rotating compartments formed by the impeller B. The two side surfaces 78 terminate at the line 79 where they connect with the center spherical surface 80 of the ball element F.

The central portion of the ball element F obliquely receives the annular wedge-shaped slot G having the converging conical side surfaces 81 and the central cylindrical surface 82. It will be noted that the axes of the slot G and of the central cylindrical surface 82 coincide and are oblique to the axis 75 of the shaft D. The angle 84 (see Fig. 7) between the axis 75 and 83 will determine the angle of oscillation of the impeller B.

The conical surfaces 78 are provided at diametrically opposite places with the recesses 85 which conform to the side surfaces of the impeller B. The impeller B is shown in assembly in Fig. 1 and removed from the casing in Figs. 10, 11 and 12.

The impeller B is preferably formed of two semi-circular sections 95 and 96 which are oppositely held together along the diameter 94 by the bolts 97, one being provided on each side of the impeller. The lower section 96 is provided with a tapped bore 98 in the shoulder 93 to receive the threaded portion 99 of the bolt 97.

The upper section is provided with a bore 109 in the shelf 92 to receive the shank 101 of the bolt 97 and also with a recess 102 to receive the head 105 of the bolt 97. The washer 104 is abutted against the shelf 92 by the head 105 of the bolt 97. The central axis 106 of the bolt extends through the bores 40 of the connections H and I so that they may be readily reached with a tool from the outside of the casing. It will be noted that portions of the head 105 extend beyond the peripheral wall 107 of the impeller as indicated particularly at 108 in Fig. 10, but this extension does not interfere with the operation of the impeller since throughout the oscillation it projects within the antechambers 51. The shouldered connection 91 assures correct location of the halves 95 and 96 in respect to each other.

Referring particularly to Fig. 12, the annular impelling surfaces 109 of the impeller are formed by the outside surfaces of the parallel walls 110 of the impeller, which parallel walls 110 are substantially spaced from each other and enclose the open portion 111. The enclosing wall 112 extends peripherally around the outside of the impeller B, and encloses the space 111.

The space 111 is also enclosed by the inwardly-converging or wedge-shaped annular wall 113 which is annularly recessed at 114 at its converging sides and at 115 at its inside portion to receive the conforming annular bearing strip 116. The inside surface 117 of the annular bearing strip 116 closely contacts with and bears upon the cylindrical surface 82 of the shaft G, (see Figs. 7 and 8), while the converging side surfaces 118 closely contact with the side surfaces 81 of the slot G, (see also Figs. 7 and 8).

The converging annular shell member 116 is preferably of a soft bearing material, while the central ball F is preferably of hard metal such as steel.

The peripheral surface 107 of the impeller is of spherical contour to conform to the spherical contour of the peripheral surface 46 of the interior chamber of the casing A. The peripheral surface 107 and the side surfaces 109 are preferably located by the abutment of the bearing surfaces 117 and 118 of the impeller B and 81 and 82 of the eccentric slot C so that there will be a satisfactory space and/or surface sealing and/or packing at all times between said surfaces 107 and 109 and the adjacent surfaces of the casing, with avoidance of contact.

This spacing may be anything between 1/1000 to 5/1000 of an inch depending on the size of the pump or spherical engine and the character of the fluid passing therethrough. The spacing of the side walls 110 of the impeller should be such that there will be sufficient width of peripheral surface 107 to assure a satisfactory lateral dimension to the surface spacing or packing.

The top of the impeller as shown in Figs. 10 and 11, is provided with a transverse slot 125 to receive the separating wall J shown in Figs. 16 and 17 and the cylindrical guide shown best in Figs. 13 to 15.

Referring to Figs. 16 and 17, from the body portion 58 of the separating wall element J project upwardly the studs 126 which are received in the recesses 127 in the wall 62 extending across the upper portion of the casing between the inlet and outlet ports H and I and the antechambers 51. The engagement between the studs 106 and the recesses 107 serve to locate the separating wall body 58.

Projecting downwardly from the bottom of the body member 58 is the fin 128 serving to form the wall J, the edge surfaces 129 of which converge inwardly to contact with the conical surfaces 78 of the side walls E.

The bottom surface 130 of the fin is of spherical contour to conform to the spherical surface 80 of the ball F. The lower inside surface 131 of the body 58 is also of spherical contour constituting a continuation of the spherical surface 46.

The fin 128 is received in the slot 132 of the guide or sliding nut K and the side surfaces 133 of said fin 128 contact with and ride against the side surfaces 134 of said slot.

The bottom surface 135 of the slot 132 is of spherical contour and constitutes a continuation of the spherical surface 80 of the ball F. The correspondingly contoured surface 30 of the fin 128 rides over said bottom surface 135. The guide K is of cylindrical contour as appears from Figs. 14 and 15 and is received in the socket 136 formed in the slot 125 of the impeller.

The cylindrical side surface 137 of the slotted guide K closely contacts with the cylindrical interior surface of the socket 136. The top surface of the slotted guide K also has a spherical contour to conform closely to the corresponding contour 131 of the separating wall element J and it constitutes a continuation of the spherical periphery 107 of the impeller B, although unlike this spherical periphery 107 it contacts with the continuation of the peripheral wall 46 as formed by the spherical surface 131 of the body 58 instead of being spaced therefrom, as is the peripheral spherical surface 107 from the conforming surface 46.

Referring to Figs. 1, 10 and 12 of the drawings it will be noted that the space 111 does not continue into the upper portion 95 of the impeller B, the upper portion of which is made substantially solid, as indicated at 139.

This solid portion 139 is provided with a recess 140 to receive a cylindrical insert 141 of the bearing metal, the inside cylindrical surface of which contacts with the cylindrical outside surface 137 of the slotted guide K.

As best shown in Fig. 11 the semicylindrical sleeve or bearing metal sections 141 are provided with the wedge attachments 142 to the solid portion 139 of the upper impeller section 95.

Provided in the portion 139 of the upper impeller section 95 is the recess or socket 143 (see Figs. 10, 12 and 13) which receives the metal projection 144 extending downwardly from the bottom of the slotted guide K. The bearing guidance afforded by the nipple 144 turning in the socket 143 and the guidance further obtained in the recess 147 at the bottom of the guide 146 in the impeller assure satisfactory cooperation of the slotted guide K and the impeller B.

The slot 125 beyond the cylindrical socket 136 is provided with the diverging surfaces 148 which diverge at such an angle to each other as to permit suitable pivotal movement of the impeller B in respect to the fin 128 of the separating wall J (see Figs. 22, 24, 26 and 28).

The operation of the impeller B when it is caused to oscillate between the side walls E in the interior of the casing A by the oblique slot G driven by the shaft D is most satisfactorily shown upon the diagrammatic views 20 to 28.

Fig. 20 diagrammatically illustrates the turning of the shaft D and Figs. 21 to 28 respectively show side and top views of the impeller when the shaft is in each of the positions I, II, III and IV of Fig. 20.

Fig. 20 may be regarded as taken in the direction of the arrows 20 on Figs. 21, 23, 25 and 27.

The radial lines I, II, III and IV also correspond to the central position of the conformation areas of the side faces 109 of the impeller B and the recesses 85 of the side walls E.

Referring to Figs. 15 to 22 when the shaft D rotates the impeller B will be caused to sweep laterally across the antechambers 51, the triangular openings 47, and the spherical peripheral surface 46 between the rotating side walls E.

As indicated best in Figs. 21, 24, 25 and 28 the obliquely located impeller B will divide the interior chamber C into two annular spherical wedge-shaped compartments L and M which will extend from the outer surface 80 of the ball F to the peripheral surface 46 of the interior chamber, or to a continuation thereof adjacent the antechambers 51 and the triangular recesses 47, and between side walls E and impelling surfaces 109 of the impeller or piston B.

These wedge-shaped compartments L and M are diametrically oppositely disposed with respect to the center point 200, of the spherical pump or machine and they will be rotated around the interior of the casing with the turning of the shaft D.

During this rotation these compartments L and M are successively opened and closed to the inlet and to the outlet ports so that fluid or liquid which is received through said inlet ports will be carried to the outlet port.

As to which will serve as the inlet and which as the outlet port is determined by the direction of rotation of the shaft D. Assuming the shaft D to rotate in the direction indicated by the arrow 155 in Fig. 21, the connection H will serve as an inlet connection, while the connection I will serve as an outlet connection. It will be noted in Fig. 21 that the inward flow along the arrow 159 from the portion 158 of the antechamber 51 will not be hydraulically shaded or obstructed by the edge 160 of the impeller B as the impeller moves away from the side of the internal chamber as shown in position I of Fig. 21 to position II of Fig 23.

For example, it will be noted in Figs. 21 to 28, that as the impeller moves through the positions I, II, III and IV that the compartments L and M will move through the wall J and will be divided thereby, so that they successively decrease in volume in communication with the outlet port I and increase in volume in communication with the inlet port H.

Referring to Fig. 22 the compartment M is substantially bisected by the wall J and as it moves from the position of Fig. 22 into the position of Fig. 24, the volume of the compartment M will increase on the inlet side of the wall J and will decrease on the outlet side of the wall J.

In Fig. 26 the entire volume of the chamber M will have passed to the inlet side of the wall J where it will have been filled with liquid or fluid. Then as shown in the movement from Fig. 26 to Fig. 28, the compartment M will be successively cut off from the outlet and inlet ports, and will then immediately again begin to open first to the outlet port I and then to the inlet port H, as shown in Fig. 28.

The inlet and outlet divisions of each compartment L and M in addition to being separated by the wall J are also separated by the conformation space between the side of the impeller B and the side wall of the chamber E.

By providing a recess or conformation in the side wall E to conform to a relatively large area of the side of the impeller B, the seals indicated by the numerals I, II, III and IV in Fig. 20 will take place over a considerable area and assure a satisfactory separation between said inlet and outlet subdivisions.

As appears from Fig. 38 when the conforming area E of the side wall comes opposite and moves across the side wall J there will be a space 350 formed through which leakage might take place between the inlet and outlet subdivisions of the compartments L and M. However, a seal will be formed by the conformation of the side of the impeller B and the side wall E, as shown in these figures. This seal across the openings 350 will be satisfactory as long as the width 351 of the conformation 85 as shown in Figs. 8 and 9 is wider than the width 352 of the end of the slot 125 indicated by the dimension 352 in Fig. 2.

It is thus apparent that the close conformation between the periphery of the impeller B in respect to the interior of the spherical device and between the side of the impeller D and the side walls E will prevent substantial leakage flow and will assure that the compartments L and M will be substantially continuously filled with liquid or fluid through the inlet port H and discharged through the outlet port I.

By forming the propelling surface 109 of the impeller parallel as shown in Fig. 12, assurance is had that a substantially non-pulsating discharge will result inasmuch as the parallel faces 109 will sweep out as much fluid per unit of time when they are approaching or departing from the conical side walls E and also whether they are near or distorted from their corresponding side walls E. This is a marked advantage residing in the parallel wall piston of the present application as contrasted to similarly designed pistons or impellers which have either converging or diverging surfaces.

Fig. 39 illustrates the relationship between the angle of oscillation 353 and the depth or amount of surface sealing 354. If the parallel walled impeller B of Fig. 39 were to have a linear conformation or contact with respect to the side walls E, the side walls E would take the position indicated by the cone 355 which it will be noted as shown at the upper right hand lower left portions of Fig. 39 corresponds to the bottom of the conformation 85, the shaded area indicating the conformation and having a depth represented by the dimension 354. To provide this conformation 85 and the depth 354 it is necessary to extend the side walls outside of the position 355 to the position 356, as indicated, which position will correspond to the normal surface 78 of Figs. 7, 8 and 9.

To decrease the amount of possible leakage across the periphery 107 of the impeller B, and also to reduce the possible leakage flow across the conformation 85, such periphery 107 and such conformation surface 105 may be provided with a series of grooves, as shown in Figs. 29 to 32 transverse to the normal direction of leakage flow.

Figs. 29 to 31 show one type of the construction of grooves as they may be applied to the conformation 85 of the side walls A. As shown in Figs. 29, 30 and 31 the conformation area 85 is divided into a series of sharp ridges 360 which extend over the entire conformation area. These ridges 360 will so reduce any leakage flow across the conformation area due to the eddy currents set up therein that when the machine initially starts to operate with close adjuxtaposition before wear takes place, a few of the end ridges 360 will suffice to set up a back pressure equal to the difference in pressure between the inlet port H and the outlet port I. With increased wear at the central bearings a greater number of grooves 360 may function to reduce the pressure difference and the total number of grooves would be more than sufficient to take up all the pressure difference between the opposite sides of the conformation area, even when the device has been operated for a very long time and when wear has taken place to make replacement and/or repair of the device desirable.

In Figs. 32 and 33 are shown a form of grooves 361 which may be utilized upon the periphery of the impeller. These whirls or eddies, as diagrammatically illustrated at 362 in the exaggerated spacing between the periphery 107 of the impeller B and the conforming surface of the interior chamber of the spherical device will substantially obstruct and set up a high back pressure to any leakage flow and reduce leakage across the periphery of the impeller.

It is to be understood that the same general type of whirls or eddies are set up at the conformation surface 85 obstructing the flow thereacross and it is also to be understood that the grooves such as 361 may be utilized on the conformation surface 361 as may also ridges be utilized upon the periphery 107 of the impeller as shown in Figs. 32 and 33.

Referring to Figs. 1 and 3 and also to Figs. 7 and 8 with the continued operation of the spherical machine shown, the contacting transverse bearing surfaces 72 of the side walls E and 76 of the adjustable thrust bearing 77 should not be permitted to wear and permit a substantial amount of play between the side walls E and said adjustable thrust bearings.

To accommodate this wear and to assure a close fit at all times between the bearing surfaces 76 and the bearing surfaces 72, the thrust bearings 77 are so formed that they may be readily adjusted without difficulty to assure that the center point of the ball will coincide with the center point of the casing and that the axes of the slot G of the shaft D and the oblique transverse axis of the impeller B will intersect at the center point of said casing.

As best shown in Figs. 1 and 3, the thrust bearings 77 are formed of the annular ring members 171 which are inserted in the openings 172 in the tubular projections 36 and 37 laterally extending from the casing A. The inside circular and vertical faces of the thrust bearing structure 77 are provided with the bearing metal liners 173 and 174, which liners are preferably formed in one piece and keyed to the ring 171, as indicated at 175 and 176.

The ends of the tubular projections 36 and 37 are provided with the flanges 177 and 178 to which are respectively bolted the flange 179 of the tubular extension 180 and the end plate 181 by the bolts 182 where the shaft D terminates in the spherical machine. Where the shaft does not terminate in the spherical machine a tubular extension 180 may also be provided for the tubular projection 36, as shown in Fig. 3. The end plate 181 and the flange 179 are provided with the recesses 183 adapted to receive the annular shims 184. By removal of the bolts 182 and of the end plate 181 and the tubular member 180, the number of shims 184 may be increased or decreased, assuring a corresponding inward or outward adjustment of the thrust bearing structures 77 to assure that the groove G, the ball F and the side walls E will be correctly positioned within the interior of the casing A. In Fig. 1 will be noted that the terminal end 70 of the shaft D extends within a recess 185 in the end plate 181 and this recess is closed by the bolted connection 182 of the end plate 181 to the flange 186.

At the other side of the casing A the extension 181 is provided with an inwardly directed annular member 187 within which are positioned a plurality of annular packing members 188 which are pressed closely around the extensions 189 of the shaft element 71 by the end member 190. This member 190 is bolted at 191 to the annular flange 192 at the end of the tubular extension 189.

As shown, the tubular extensions 38, see particularly Figs. 1 to 5 extend upwardly from the casing and are provided with the flanges 193 which are stepped at 194 to enable convenient bolted connection if desired with other conduits.

Referring to the guide member shown in assembly in Figs. 10 and 13 and removed therefrom in Figs. 13 and 14, it has been found desirable to have the center of gravity of this guide member positioned as closely adjacent to the periphery 107 of the impeller as possible. And to accomplish this the bores 198 are provided, see particularly Figs. 10, 14 and 15, which bores decrease the mass adjacent the lower portion of the guide K and move the center of gravity to the peripheral spherical surface of the guide where it is most satisfactorily placed. By locating the mass of the guide K in this manner the cocking and canting of the guide so as to cause uneven wear on the pivotal bearing in the socket B in the bearing G or along the wall J is prevented.

By making the sliding abutment or slotted nut cylindrical instead of downwardly converging a much better proportion of the bearing stress is obtained and even forces on the side of the bearing guide or on the sides of the slot therethrough are largely prevented and/or avoided.

As a result the principal wear will take place upon the upper and lower surfaces of the nut which are best designed to receive the same, while the cylindrical side surfaces of the nut as well as the side surface of the slot, will perform their main function of correctly guiding the impeller or piston in its oscillating movement.

In respect to the action between the oblique slot G and the impeller B the contact between the cylindrical bearing surface 82 of the slot (see Figs. 7 and 8) and the cylindrical interior bearing surfaces 117 of the impeller B assures a correct space packing or seal amounting to several thousandths of an inch between the periphery 107 of the impeller and the spherical surface 46 of the casing A.

The bearing contact between the converging side surface 81 of the slot G and the surfaces 118 will similarly assure a correct amount of space packing between the recesses 85 of the side walls E and the side impelling surfaces 109 of the impeller.

It is desirable that these surfaces be satisfactorily lubricated and it has been found suitable to accomplish this by the provision of grooves extending across the bearing surfaces 117 and 118 in the bearing metal insert in the impeller in a manner which is more fully described in the co-pending application Serial No. 656,640, filed February 13, 1933.

Referring to Figs. 2 and 10 to 12, a series of spaced inwardly converging grooves 200 are provided extending along the bearing surface 118, which grooves terminate in the annular groove 201 at the junction of the cylindrical bearing surface 117 and inwardly projecting bearing surface 118. Connecting the annular grooves 201 are the transverse grooves 202. In operation there will be a relatively higher pressure on one side of the separating wall D than on the other side of the separating wall and as a result the liquid being actuated by the impeller B will be forced from the region of high pressure to the region of low pressure through the grooves 200, 201, and 202.

For example, referring to Fig. 10, if we assume that the shaft D is turning so that the high pressure side will be to the left of the slot 125, while the low pressure side will be to the right of the slot 125, the liquid may enter through the left hand grooves 200, then flow into the annular groove 201, then into the transverse grooves 202 and finally out on the low pressure side of the impeller through the right hand grooves 200 (not shown). This flow of liquid under pressure through the grooves 200, 201 and 202 will assure satisfactory lubrication at all times of the surfaces 117 and 118 and will greatly reduce the wear thereof, eliminating the need of constant adjustment.

Similar arrangements may be made, if desirable, for lubricating the bearing between the bearing surfaces 72 and 76 and for lubricating the bearing surfaces between the shaft sections 70 and 71 and the bearing liners 173.

With other shapes of slots G, as for example where the side walls 81 are parallel to each other instead of being converging, similar lubricating arrangements may also be provided.

In operation of the spherical engines of the type herein described, it has been found most satisfactory to make the central cylindrical bearing 82 of as large a diameter as compared to the depth of the slot as possible.

For example, it has been found most desirable to make the ratio of diameter of the ball F to the diameter of the cylindrical surface 82 substantially less than 3 to 1 and preferably between 2 to 1. With the ratio of dimensions of this character the space packing between the side and peripheral surface of the impeller is most satisfactorily achieved and a very efficient operation of the pump with the minimum of frictional loss is most conveniently attained.

Although the tubular members 38 are shown as extended directly upwardly from the casing A it is understood that they may be connected to the casing in many other ways. One or both of these connections may be connected to the casing parallel to the tubular members 36 and 37. Also, if desired, the projections 38 may be so connected to the antechambers 51 that the liquid will flow through the bore 40 spirally or circularly into the antechambers 51 and from there into the compartments L and M.

It is also possible to position the bores 40 so that they oppositely enter the sides of the casing parallel to the shaft in such a manner that each bore 40 will connect with the opposite antechamber 51 from the side from which it connects with the casing. In this instance, a smooth circular or spiral flow may be obtained between the inlet and outlet port connections H and I and through the rotating compartments L and M.

In the embodiment of Figs. 18, 19 and 19a, correspondingly functioning parts are indicated by the same numerals as the embodiment of Figs. 1 to 17 except that the corresponding letters and numerals are primed.

The embodiment of Figs. 18, 19 and 19a differs from the embodiment of Figs. 1 to 17 in that the elements J and K of the embodiment of Figs. 1 to 17 are combined in a single oscillating wall element J'.

The oscillating wall element J' is received in the slot 209 in the impeller B' and is provided with an upper spherical surface 210 which contacts with the spherical surface 211 at the bottom of the conical member 52'. The lower spherical surface 212 rides in the bottom of a slot 213 in the impeller. The ends of the wall J' are curved as indicated at 214 and have a line contact with the side walls E'. The surface 214 is always of such an extent that even at the extreme oblique position of the impeller as shown in Fig. 19 there will still be contact between the side wall B' and the end face 214 between the oscillating abutment wall J'. As shown best in Fig. 19 the end faces 214 of the impeller converge inwardly toward the center point of the casing to conform to the conical side walls E'.

In both the embodiments of Figs. 1 to 17 and 18, 19 and 19a, when the space packing 85' moves opposite the ends of the fixed wall J or the oscillating wall J', the conformation between the side face 109 of the impeller B and the recess 85 in the side wall E will assure a seal across the open space between the end of the side wall J and J', and the bottom of the recess 85 or 85'.

To prevent the wedging or insertion of particles being carried by liquid through the pump in the conformation or convergence between the recesses 85 and the side surfaces 109, best shown in Figs. 7 and 8 are provided, these wiper grooves being provided with the sharp edges 226 which tend to prevent such solid particles from moving within said side surfaces.

The spherical machines of the present invention may be provided in other instances with other forms of separating walls, guides and casings. For example, the guide instead of being in the form of a cylindrical member K may take the form of a ball or pin, and/or it may be positioned substantially apart from the fixed separating wall, as shown in copending applications Serial Numbers 673,244 and 673,245. Less desirably, the impeller may also be of diverging shape in applications 656,637; 656,641 and 696,944, or of converging shape, as shown in applications 656,637 and 656,639. The spherical machine of the present invention may also be utilized as a vacuum pump with a sealing liquid in the manner shown in application 656,642, or as a gas or vapor compressor with a fin guide supported by a porting disc fitting in the wall of the device, as shown in application #656,638.

Although not preferred, instead of a cylindrical slotted guide, conical or converging guides may be employed as shown in applications 656,637 and 656,641.

It is obvious, of course, that instead of the shaft D rotating and the casing A standing still, the shaft D may be fixed and the casing A may be rotated. The side walls also if desired may be fixed in respect to the casing A but in such case the recesses 85 therein are preferably eliminated and other means of sealing or packing between the side surfaces of the impeller and the side walls of the interior chamber may be employed.

The grooves 300 as shown in Figs. 7, 8 and 9, serve to relieve any compression or vacuum which may be formed in the spaces 400 at the ends of the slots 125 during the operation of the device as shown in Fig. 38, when the conformation spaces 85 pass across the end of the slot 125 in the impeller band across the end of the separating wall J. These grooves are not necessarily employed, but may be omitted if desired.

To decerase the spaces $400^2$ in certain instances it is desirable to decrease the spaces $400^2$ so that a minimum volume will be formed within which compression and/or vacuum action may take place, which compression or vacuum action is undesirable since it will cause a knock which will disturb the smooth operation of the spherical device.

This is accomplished as shown in Figs. 34 to 37 by increasing the size of the nut $K^2$ so that it will have a diameter substantially equal to or greater than the width of the impeller $B^2$.

In this modification it will be noted that the volume $400^2$ is substantially less than the volume 400, as indicated in Fig. 38, so that there is much less loss in the vacuum or compression taking place in these small volumes. However, due to the increased diameter of the nut $K^2$ when the conformation area $85^2$ passes over the separating wall $J^2$ and across the transverse slot in the impeller $B^2$, the sides of the nut $K^2$ would tend to project beyond the faces of the piston. To overcome this, the sides of the nut are flattened, as indicated at 405 so that they will conform to the conformation or recess $85^2$ on the side walls $E^2$, as indicated in Fig. 35.

In the embodiment of Figs. 34 to 37 elements which function similarly to elements in the embodiment of Figs. 1 to 17 are designated by the same numerals provided with a superior 2.

When the cylindrical guide $K^2$ is of larger diameter than the width of the impeller $B^2$ so that it is necessary to flatten the side of such guide, as shown at 405, it is desirable to cut off the lower side edges of the nut $K^2$ as indicated at 409 to conform to the lower portion of the conformation depression $85^2$.

In the embodiment shown in Figs. 1 to 17 it is often desirable to have a by-passing of the liquid flow through the casing through the thrust bearing surfaces between the adjustable thrust bearing and the side walls E and also through the thrust bearing stretcher.

An arrangement for passages for accomplishing this is shown in Figs. 1 and 5. Referring to these figures it will be noted that the antechambers 51 communicate with the annular spaces 500 instead of the thrust bearings by the bores 501 and 502. The bore 503 is provided at the opening of the thrust bearing structure to permit circulation of fluid through the space 185 at the end of the shaft D. The bores 504 between the space 500 and the annular groove 505 permit flow of fluid from the space 500 to or away from the bearing surface 76, (see Fig. 5). From the space 505 the liquid may flow into or away from the grooves 506 upon the surface 76 of the thrust bearing. The grooves 506 on the surface 76 on the thrust bearing communicate with the interior of the spherical device through the space between the periphery of the side wall M and the conforming spherical surface 74 of the interior of the casing.

By the expression "parallel spaced surface conformations" utilized in the accompanying claims is meant the conformation of the side of the impeller with the depression or recess in the side walls at the positions indicated at 85 in Fig. 39, and of the periphery of the impeller in respect to the interior periphery of the interior pumping chamber indicated in Fig. 33. In the preferred form, as shown upon the drawings, there is a fixed parallel spacing between the conforming encircling surface of the chamber, the tubular surfaces being in adjuxtaposition to each other but at all times being spaced from each other, and devoid of contact with each other. The spaced surface conformations differ from supporting contacts such as are encountered in bearing clearances in which the outer bearing member is of a substantially greater diameter than the inner diameter of the bearing member, with the result that concentrically converging and diverging spaces will be formed between the inner and outer bearing element, with loading at one side forming a contact along a line and an unloaded opposite side with an open space which gradually decreases in width along a line of contact at the loaded side.

What is claimed is:

1. In combination, a relatively fixed casing having an interior taking the form of a spherical section, said section being provided with a spherical peripheral wall and with rotating side walls, and provided with elongated separated inlet and outlet antechambers extending peripherally along said peripheral wall, a non-rotating oscillating impeller therein, a shaft connected to said side walls to rotate the same and having an oblique bearing for said impeller passing into said casing, and a pivotally mounted guide connected to said impeller to prevent said impeller from turning, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said impeller having parallel spaced surface conformations with the side walls of said interior on opposite sides of the center point, the periphery and impelling side surfaces of said impeller being located in close adjuxtaposition to said spherical peripheral wall and said conformations of the side walls but being spaced substantially therefrom to avoid frictional contact, the inlet and outlet antechambers intersecting said spherical peripheral wall in the form of triangular gores controlled by the lateral oscillation of the edge of the impeller between the side walls of the casing, said conformations being formed by positioning the oscillating impeller so obliquely within said interior that the portions of said impeller which converge towards said side walls will extend below the converging surface of said side walls, said side walls being bevelled off at diametrically opposite places to receive the converging sides of said impeller, and said ports extending substantially around the major portion of the spherical periphery of said interior and converging to substantially pointed apices substantially diametrically opposite their entrance to said interior, the adjuxtapositioned surfaces causing said conformations being maintained in parallelism but substantially separated from each other throughout operation and the sides of said impeller being smooth and continuous and devoid of projections and embossments.

2. In combination, a relatively fixed casing having an interior taking the form of a spherical section, said section being provided with a spherical peripheral wall and with rotating side walls, and provided with elongated separated inlet and outlet antechambers extending peripherally along said peripheral wall, a non-rotating oscillating impeller disc therein, a shaft having an oblique bearing for said impeller passing into said casing, and a cylindrical guide pivotally mounted in the edge of the impeller to prevent said impeller from turning, the axis of said guide being perpendicular to and intersecting the axis of the shaft, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said disc having parallel spaced surface conformations with the side walls of said interior on opposite sides of the center point, the periphery and sides of said impeller being located in close adjuxtaposition to said spherical peripheral wall and said side wall conformations, but being spaced substantially therefrom to avoid frictional contact, the inlet and outlet antechambers intersecting said spherical peripheral wall in the form of spherical gores and being controlled by the lateral oscillation of the edges of the impeller between the side walls of the casing, said conformations being formed by positioning the oscillating impeller so obliquely within said interior that the portions of said impeller which converge towards said side walls will extend below the converging surface of said side walls, said side walls being bevelled off at diametrically opposite places to receive the converging sides of said impeller, and said ports extending substantially around the major portion of the spherical periphery of said interior and converging to substantially pointed apices substantially diametrically opposite their entrance to said interior, the adjuxtapositioned surfaces causing said conformations being maintained in parallelism but substantially separated from each other throughout operation and the sides of said impeller being smooth and continuous and devoid of projections and embossments.

3. In combination, in a spherical machine, a relatively fixed casing having an interior chamber to receive and discharge fluids and a non-rotating oscillating disc-like impelling piston therein, said interior chamber being provided with rotating side walls and with a peripheral wall and said piston being positioned obliquely within said chamber, said side walls being provided with extended surfaces conforming to substantial areas on the sides of the piston and said peripheral walls being provided with elongated gore-like port openings, said conformations being formed by positioning the oscillating impeller so obliquely within said interior that the portions of said impeller which converge towards said side walls will extend below the converging surface of said side walls, said side walls being bevelled off at diametrically opposite places to receive the converging sides of said impeller, and said ports extending substantially around the major portion of the spherical periphery of said interior and converging to substantially pointed apices substantially diametrically opposite their entrance to said interior, the adjuxtapositioned surfaces causing said conformations being maintained in parallelism but substantially separated from each other throughout operation and the sides of said impeller being smooth and continuous and devoid of projections and embossments.

4. In combination, in a spherical machine, a relatively fixed casing having an interior chamber to receive and discharge fluids and a non-rotating oscillating disc-like impelling piston therein, said interior chamber being provided with rotating side walls and a peripheral wall and said piston being positioned obliquely within said chamber, said impelling piston being provided with parallel spaced conformations respectively in respect to the peripheral wall and the side walls and said peripheral walls being provided with elongated port openings controlled by the periphery of the piston, said conformations being formed by positioning the oscillating impeller so obliquely within said interior that the portions of said impeller which converge towards said side walls will extend below the converging surface of said side walls, said side walls being bevelled off at diametrically opposite places to receive the converging sides of said impeller, and said ports extending substantially around the major portion of the spherical periphery of said interior and converging to substantially pointed apices substantially diametrically opposite their entrance to said interior, the adjuxtapositioned surfaces causing said conformations being maintained in parallelism but substantially separated from each other throughout operation and the sides of said impeller being smooth and continuous and devoid of projections and embossments.

5. In combination, in a spherical machine, a relatively fixed casing having an interior chamber to receive and discharge fluids and a non-rotating oscillating disc-like parallel-walled hollow impelling piston therein, said interior chamber being provided with rotating side walls and a peripheral wall, and said piston being positioned obliquely within said chamber, said side walls being provided with diametrically opposed surfaces which conform to the side faces of the piston and said peripheral wall being provided with elongated inlet and outlet port connections, said conformations being formed by positioning the oscillating impeller so obliquely within said interior that the portions of said impeller which converge towards said side walls will extend below the converging surface of said side walls, said side walls being bevelled off at diametrically opposite places to receive the converging sides of said impeller, and said ports extending substantially around the major portion of the spherical periphery of said interior and converging to substantially pointed apices substantially diametrically opposite their entrance to said interior, the adjuxtapositioned surfaces causing said conformations being maintained in parallelism but substantially separated from each other throughout operation and the sides of said impeller being smooth and continuous and devoid of projections and embossments.

6. In a spherical apparatus, a relatively fixed casing having an interior chamber, an impelling piston positioned obliquely therein, means to impart an oscillating movement to said piston about a fixed center point, and a cylindrical slotted guide engaging said piston to prevent rotation thereof while it is being oscillated by said means, said impeller being provided with a transverse slot and said slot being provided with a cylindrical socket receiving said guide, a separating wall extending transversely across said chamber at one side thereof and through said slotted guide, a shallow cylindrical socket of smaller diameter being formed in the bottom of said guide and said guide being provided with a short annular nipple extension fitting into said socket whereby a balancing effect is obtained.

7. In a spherical apparatus, a relatively fixed casing having an interior chamber, an impelling piston positioned obliquely therein, means to impart an oscillating movement to said piston about a fixed center point, and a guide engaging said piston to prevent rotation thereof while it is being oscillated by said means, said impeller being provided with a transverse slot and said slot receiving said guide, said guide including a separating wall extending transversely across said chamber at one side thereof and through said slot, said wall being provided with a cylindrical-shaped slotted sliding member, the slot of which receives and contacts with the sides of said separating wall and said piston being provided with a conforming cylindrical socket to receive said slotted sliding member, the central portion of the sliding member being provided with bores to lessen the weight thereof, said bores extending substantially radially from the inside faces of said sliding member adjacent the center of the apparatus toward, but terminating substantially short of, the outside faces of said sliding member removed from the center of said apparatus, said bores causing location of the center of gravity of said sliding member adjacent the periphery of said chamber.

8. In combination, a relatively fixed casing having an interior taking the form of a spherical section, said section being provided with a peripheral wall and with rotating side walls, and provided with elongated separated inlet and outlet antechambers intersecting said peripheral wall, an oscillating impeller disc therein, a shaft connected to said side walls to rotate the same and having an oblique bearing for said impeller passing into said casing, and a cylindrical guide pivotally mounted in the edge of the impeller to prevent said impeller from turning with its axis perpendicular to and intersecting the axis of said shaft, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said disc having parallelly spaced surface conformations with the side walls of said interior on diagonally opposite sides of the center point, the periphery and sides of said impeller being located in close adjuxtaposition to said spherical peripheral wall and said side wall conformations, but being spaced substantially therefrom to avoid frictional contact, the inlet and outlet antechambers being controlled by the lateral oscillation of the edge of the impeller between the side walls of the casing, said side walls being connected to the shaft to rotate therewith, and said guide having a diameter substantially greater than the width of the impeller and being provided with conforming side surfaces to conform to said spaced surface conformations of the side walls, the adjuxtapositioned surfaces forming said conformations being maintained in parallelism but substantially separated from each other throughout operation and the sides of said impeller being smooth and continuous and devoid of projections and embossments.

9. In combination, a relatively fixed casing having an interior taking the form of a spherical section, said section being provided with a peripheral wall and with rotating side walls, and provided with elongated separated inlet and outlet antechambers intersecting said peripheral wall, an oscillating impeller disc therein, a shaft connected to said side walls to rotate the same and having an oblique bearing for said impeller passing into said casing, and a guide pivotally mounted in the edge of the impeller to prevent said impeller from turning with its axis perpendicular to and intersecting the axis of said shaft, said impeller forming a plurality of reversely congruent separated chambers in said casing and upon actuation by said shaft serving successively to open and close said chambers to said inlet antechamber and then to the outlet antechamber whereby fluid will be moved through said casing from said inlet antechamber to said outlet antechamber, the sides of said disc having parallel spaced surfaces and there being corresponding conforming surfaces in the walls of said interior on diagonally opposite sides of the center point, the periphery and sides of said impeller being located in close adjuxtaposition to said spherical peripheral wall and said side wall conformations, but being spaced substantially therefrom to avoid frictional contact, the inlet and outlet antechambers being controlled by the lateral oscillation of the edge of the impeller between the side walls of the casing, said side walls being connected to the shaft to rotate therewith, grooves being placed upon said conforming surfaces to obstruct leakage flow thereby, the adjuxtapositioned surfaces forming said conformations being maintained in parallelism but substantially separated from each other throughout operation and the sides of said impeller being smooth and continuous and devoid of projections and embossments.

10. In a fluid actuator, a spherical enclosure, an impelling piston member extending across said enclosure, a fluid reaction member also extending across said enclosure, oblique holding means to hold said impelling piston member obliquely in respect to said fluid reaction member, whereby they will diametrically oppositely approach and diverge from each other to form an annular-like wedge-shaped fluid receiving and discharging compartment, shaft means rotatably movable and said reaction member being rotatably movable therewith and with said oblique holding means, inlet and outlet connections to and from said enclosure, guide means to prevent rotation of said impelling piston member and in cooperation with the holding means to cause said impelling piston member and said fluid reaction member to undergo a relative lateral and longitudinal oscillating movement simultaneously with rotation of said reaction member and said oblique holding means and said shaft, whereby said wedge-shaped fluid receiving and discharging compartment is rotated into and out of communication with said inlet and outlet connections, said outlet and inlet connections being separated from each other and said compartment being divided into two sub-compartments, one of which increases in volume in communication with the inlet connection and the other of which decreases in volume in communication with the outlet connection during the rotation of the compartment, said reaction member being bevelled off where said piston member approaches it, whereby said impelling piston member may be depressed below the general surface of said reaction member, said reaction member being positioned in respect to said holding means, so that said depression therein will always be opposite the approaching piston surface of said piston member, and said connections taking the form of ports extending as triangular gores substantially over the major portion of the periphery of said enclosure said triangular gores extending to their apices at a point substantially diametrically opposite said inlet and outlet port connections.

11. In a liquid pump, a spherical casing including a peripheral spherical enclosure, a disc-like transversely slotted impelling piston member extending diametrically across said enclosure with annular propelling faces, conical side walls extending chordally across and closing the sides of said enclosure, a central obliquely slotted ball to hold said impelling piston member obliquely in respect to said walls whereby said walls and faces diametrically oppositely approach and diverge from each other to form a plurality of annular-like wedge-shaped fluid receiving and discharging compartments extending laterally between said side walls and propelling faces and radially between said ball and said peripheral enclosure, shaft means to rotate said ball member and said side walls rigidly connected thereto, inlet and outlet ports intersecting said enclosure, guide means in said slot in said piston member to prevent rotation of said piston member and to cause said impelling piston member to undergo a relative oscillating movement laterally in respect to and between said side walls upon rotation of said ball member by said shaft, whereby said wedge-shaped fluid receiving and discharging compartments are rotated into and out of communication with said inlet and outlet connections, said device being provided also with a transverse separating wall extending between said outlet and inlet ports passing through said transverse slot in said piston member and dividing each of said compartments during its rotation into two sub-compartments, one of which increases in volume in communication with the inlet connection and the other of which decreases in volume with the outlet connection during the rotation of the compartments, said annular propelling faces being continuous and uninterrupted except for said slot, said piston member being positioned obliquely within said enclosure so that said propelling faces will be positioned below the normal surface of said conical walls upon convergence therewith and said conical side walls being continuous except for a depression formed therein into which the extension of said annular propelling faces extends and said connections extending as triangular gores over substantially the major portion of the periphery of said enclosure said triangular gores extending to their apices at a point substantially diametrically opposite said inlet and outlet port connections.

12. In a fluid actuator, a spherical enclosure, an impelling piston member extending across said enclosure, a fluid reaction member also extending across said enclosure, rotatable oblique holding means to hold said impelling piston member obliquely in respect to said fluid reaction member whereby they will diametrically oppositely approach and diverge from each other to form an annular-like wedge-shaped fluid receiving and discharging compartment, shaft means rotatably movable and said reaction member being rotatably movable therewith and with said oblique holding means, inlet and outlet connections to and from said enclosure, guide means to prevent rotation of said impelling piston member and in cooperation with the holding means to cause said impelling piston member and said fluid reaction member to undergo a relative lateral and longitudinal oscillating movement simultaneously with rotation of said reaction member and said oblique holding means and said shaft, whereby said wedge-shaped fluid receiving and discharging compartment is rotated into and out of communication with said inlet and outlet connections, said actuator being provided with a separating wall whereby said outlet and inlet connections are separated from each other and said compartment is divided into two subcompartments, one of which increases in volume in communication with the inlet connection and the other of which decreases in volume in communication with the outlet connection during the rotation of the compartment, said reaction member being recessed where said piston member most closely approaches it, whereby said impelling piston member is depressed below the general surface of said reaction member into said recess, said reaction member being positioned in respect to said holding means, so that said depression therein will always be opposite the approaching piston surface of said piston member, and narrow grooves extending along the sides of said recess on said reaction member radially from the outer portion of said reaction member to the inner portion of said reaction member, said grooves being substantially depressed below the general surface of said reaction member.

13. In a liquid pump, a spherical casing including a peripheral spherical enclosure, a disc-like transversely slotted impelling piston member extending diametrically across said enclosure with annular propelling faces, conical side walls extending chordally across and closing the sides of said enclosure, a central obliquely slotted ball to hold said impelling piston member obliquely in respect to said walls whereby said walls and faces diametrically oppositely approach and diverge from each other to form a plurality of annular-like wedge-shaped fluid receiving and discharging compartments extending laterally between said ball and said peripheral enclosure, shaft means to rotate said ball member and said side walls rigidly connected thereto, inlet and outlet ports intersecting said enclosure, guide means in said slot in said piston member to prevent rotation of said piston member and to cause said impelling piston member to undergo a relative oscillating movement laterally in respect to and between said side walls upon rotation of said ball member by said shaft, whereby said wedge-shaped fluid receiving and discharging compartments are rotated into and out of communication with said inlet and outlet connections, said device being provided also with a transverse separating wall extending between said outlet and inlet ports passing through said transverse slot in said piston member and dividing each of said compartments during its rotation into two sub-compartments, one of which increases in volume in communication with the inlet connection and the other of which decreases in volume with the outlet connection during the rotation of the compartments, said annular propelling faces being continuous and uninterrupted except for said slot, said piston member being positioned obliquely within said enclosure so that said propelling faces will be positioned below the normal surface of said conical walls upon convergence therewith and said conical side walls being continuous except for a depression formed therein, into which the extension of said annular propelling faces extends, said conical walls being provided with narrow grooves at the sides of said depression and below the surface of said conical side walls.

14. In a fluid actuator, a spherical enclosure, an impelling piston member extending across said enclosure, a fluid reaction member also extending across said enclosure, rotatable oblique holding means to hold said impelling piston member obliquely in respect to said fluid reaction member whereby they will diametrically oppositely approach and diverge from each other to form an annular-like wedge-shaped fluid receiving and discharging compartment, shaft means rotatably movable and said reaction member being rotatably movable therewith and with said oblique holding means, inlet and outlet connections to and from said enclosure, guide means to prevent rotation of said impelling piston member and in cooperation with the holding means to cause said impelling piston member and said fluid reaction member to undergo a relative lateral and longitudinal oscillating movement simultaneously with rotation of said reaction member and said oblique holding means and said shaft, whereby said wedge-shaped fluid receiving and discharging compartment is rotated into and out of communication with said inlet and outlet connections, said actuator being provided with a separating wall whereby said outlet and inlet connections are separated from each other and said compartment is divided into two sub-compartments, one of which increases in volume in communication with the inlet connection and the other of which decreases in volume in communication with the outlet connection during the rotation of the compartment, said reaction member being recessed where said piston member most closely approaches it, whereby said impelling piston member is depressed below the general surface of said reaction member, into said recess, said reaction member being positioned in respect to said holding means, so that said depression therein will always be opposite the approaching piston surface of said piston member, and transverse grooves on the surface of said reaction member extending into the edge of said recess.

15. In a liquid pump, a spherical casing including a peripheral spherical enclosure, a disc-like transversely slotted impelling piston member extending diametrically across said enclosure with annular propelling faces, conical side walls extending chordally across and closing the sides of said enclosure, a central obliquely slotted ball to hold said impelling piston member obliquely in respect to said walls whereby said walls and faces diametrically oppositely approach and diverge from each other to form a plurality of annular-like wedge-shaped fluid receiving and discharging compartments extending laterally between said ball and said peripheral enclosure, shaft means to rotate said ball member and said side walls rigidly connected thereto, inlet and outlet ports intersecting said enclosure, guide means in said slot in said piston member to prevent rotation of said piston member and to cause said impelling piston member to undergo a relative oscillating movement laterally in respect to and between said side walls upon rotation of said ball member by said shaft, whereby said wedge-shaped fluid receiving and discharging compartments are rotated into and out of communication with said inlet and outlet connections, said device being provided also with a transverse separating wall extending between said outlet and inlet ports passing through said transverse slot in said piston member and dividing each of said compartments during its rotation into two sub-compartments, one of which increases in volume in communication with the inlet connection and the other of which decreases in volume with the outlet connection during the rotation of the compartments, said annular propelling faces being continuous and uninterrupted except for said slot, said piston member being positioned obliquely within said enclosure so that said propelling faces will be positioned below the normal surface of said conical walls upon convergence therewith and said conical side walls being continuous except for a depression formed therein, into which the extension of said annular propelling faces extends, and transverse grooves extending on said conical walls into the edges of said depression.

16. In a liquid pump, a spherical casing including a peripheral spherical enclosure, a disc-like transversely slotted impelling piston member extending diametrically across said enclosure with annular propelling faces, conical side walls extending chordally across and closing the sides of said enclosure, a central obliquely slotted ball to hold said impelling piston member obliquely in respect to said walls whereby said walls and faces diametrically oppositely approach and diverge from each other to form a plurality of annular-like wedge-shaped fluid receiving and discharging compartments extending laterally between said side walls and propelling faces and radially between said ball and said peripheral enclosure, shaft means to rotate said ball member and said side walls rigidly connected thereto, inlet and outlet ports intersecting said enclosure, guide means in said slot in said piston member to prevent rotation of said piston member and to cause said impelling piston member to undergo a relative oscillating movement laterally in respect to and between said side walls upon rotation of said ball member by said shaft, whereby said wedge-shaped fluid receiving and discharging compartments are rotated into and out of communication with said inlet and outlet connections, said device being provided also with a transverse separating wall extending between said outlet and inlet ports passing through said transverse slot in said piston member and dividing each of said compartments during its rotation into two sub-compartments, one of which increases in volume in communication with the inlet connection and the other of which decreases in volume with the outlet connection during the rotation of the compartments, said shaft means extending beyond the sides of said casing and said casing having a tubular extension encircling and enclosing said shaft extension, said pump being provided with passages connecting said ports and the interior of said tubular extension.

FRANK A. PESCHL.